2,717,875
CONTROLLING VISCOSITY OF DRILLING FLUIDS

Walter J. Weiss, Rolling Hills Area, Calif., assignor to The Texas Company, New York, N. Y., a corporation of Delaware No Drawing. Application July 1, 1952, Serial No. 296,767

13 Claims. (Cl. 252—8.5)

The present invention relates to drilling subsurface wells by means of well drilling tools and, more particularly, to rotary drilling operations involving the circulation of a water base drilling fluid or mud containing colloidal particles of clayey material through the bore hole and about the drilling bit.

The present invention is concerned with controlling the viscosity of aqueous drilling fluids or muds comprising an aqueous suspension of dispersible clay, and contemplates overcoming the undesired increase in viscosity which may tend to occur inherently or as the result of the drilling operation.

More specifically, the present invention involves regulating the viscosity of aqueous clay-containing drilling fluids of undesirably high viscosity by incorporation of a viscosity reducing agent of the class consisting of pyruvic acid and its water voluble alkali metal or alkaline earth metal salts. By this means a profound reduction in mud viscosity is realized by additions of only small quantities of the pyruvic acid or its salts. For example, as low as 0.1 pound of additive per barrel of mud may be sufficient. In general, the mud viscosity progressively decreases with increasing proportions of the pyruvic acid materials. Ordinarily, the desired viscosity reduction is realized with from about 1/10 to about 5 pounds per barrel, usually about 0.2–3 pounds per barrel, the actual addition required depending upon the nature of the mud composition and the extent of viscosity reduction required.

The present invention is of particular advantage from the standpoint of enabling viscosity control without adversely affecting the other properties of the mud. It enables the drilling fluid to be maintained at the desired viscosity such that it readily circulates through the system, is capable of returning the drilling cuttings in suspension during flow up the well, will permit the cuttings to settle out of the mud pits and the like. It, therefore, facilitates the use of drilling fluids which have become excessively viscous due to the inherent weight or nature of the suspended material or additives, as well as fluids which have become thickened by traversing subsurface formations, which introduce adverse contaminants. Such contamination may also occur, for instance, in drilling a cement plug.

The present invention is applicable, in general, to aqueous clay containing drilling fluids comprising clay particles responsive to viscosity control by means of quebracho extract. By the term "clay particles responsive to viscosity control by means of quebracho extract" or "dispersible clay particles," as used herein, is meant the prevalent clays which, as an aqueous dispersion, are subject to thinning or viscosity reduction by small additions of quebracho extract or similar organic dispersant. These clay dispersions are in direct contrast to certain abnormal clays found, for example, in the Rogers Lake mud which is thickened by dispersants such as quebracho. The exact cause of this abnormality is in doubt, but, in any event, defines a restricted class of clays which are not responsive to dispersants of the present character.

For example, alkaline earth metal compounds, such as lime and/or the presence of substantial amounts of caustic alkali, exert a profound effect upon clay suspension muds, causing an undesired increase in viscosity and necessitating the addition of a stabilizing or viscosity reducing agent. To illustrate the effect of the present agent upon a high pH, limed mud, slaked lime in the amount of 7 pounds per API barrel and caustic soda in the amount of 1.75 pounds per barrel were mixed into Kern #35 hole mud.

Kern #35 hole mud is the mud produced while drilling the #35 well in the Kern area of the Ramona field, Ventura District, California.

The resulting chemically treated mud was a highly gelled, semi-plastic mass, in general, unsuitable for use as a drilling fluid. To this was added 1.75 pounds of pyruvic acid per API barrel of mud. The resulting product was a water-thin fluid having a Stormer viscosity at 600 R. P. M. and 77° F. of only 8.4 centipoises. Moreover, the product incorporating the viscosity reducing material exhibited zero pounds per 100 square foot shear values at zero and 10 minutes' time in accordance with the Shearometer test.

Accordingly, therefore, the present dispersant exhibits a striking effect in connection with a highly gelled, high pH, caustic soda-lime system.

The agent is likewise effective in the presence of more moderate concentrations of caustic soda. For example, in another illustrative test, a stock solution of 10 grams of pyruvic acid and 10 grams of caustic soda was made up with distilled water to form 100 milliliters of treating solution. Successively increased quantities of this stock solution were then added to separate batches of the Kern #35 hole mud and viscosity measurements made of the resulting products.

The following table lists for each test batch the volume of stock solution added per 100 milliliters of mud, the resulting amounts of caustic soda and pyruvic acid thus incorporated in the mud, and the viscosity of the resulting mixture:

| Addition per 100 ml. of mud | | | Stormer Visc. at 600 r. p. m. and 77° F. (Centipoises) | Percent Reduction in Visc. |
| --- | --- | --- | --- | --- |
| Stock Sol., cc. | NaOH, gms. | Pyruvic Acid, gms. | | |
| 0 | 0 | 0 | 64.2 | (Untreated Visc.) |
| 1.0 | 0.1 | 0.1 | 28.8 | 55.1 |
| 2.5 | 0.25 | 0.25 | 19.5 | 69.6 |
| 5.0 | 0.5 | 0.5 | 16.4 | 74.5 |

Following are the equivalent distilled water dilution values on test samples to which equivalent quantities of pure distilled water were added to the mud corresponding respectively to the amounts of added stock solution in the preceding tests. Accordingly, these figures exemplify the extent of viscosity reduction attributable to the thinning effect of water alone:

| Addition per 100 ml. of mud | Stormer Visc. at 600 r. p. m. and 77° F. (Centipoises) | Percent Reduction in Visc. |
| --- | --- | --- |
| Distilled Water: | | |
| 1.0 | 59.6 | 7.2 |
| 2.5 | 54.5 | 15.1 |
| 5.0 | 50.2 | 21.8 |

The foregoing tables, therefore, establish the substantial viscosity reduction resulting from the presence of pyruvates in a mud containing, moderate concentration of sodium hydroxide, in accordance with what is known as red mud practice wherein the pH ranges from about 8–12.

On the other hand, in the presence of substantial amounts of slaked lime but with no added caustic soda, a similarly striking reduction in viscosity occurs. Thus, for example, Kern #35 hole mud containing 7 pounds per barrel of slaked lime formed a semi-plastic flocculated mass. This was treated by the addition of 1.75 pounds per barrel of pyruvic acid. Immediately after the addition, the mud exhibited a Stormer viscosity at 600 R. P. M. and 77° F. of only 17.4 centipoises.

The foregoing data exemplifies the dispersant or viscosity reducing effect of the pyruvic acid throughout a wide range of pH and in the presence of strongly flocculating additives.

As above indicated, the viscosity reducing effect is a characteristic not only of the pyruvic acid and the sodium salt of the above examples, but also the other alkali metal salts of pyruvic acid such as potassium pyruvate, as well as any soluble alkaline earth metal salts such as calcium, magnesium, strontium, barium pyruvate and the like.

For example, a sample of the Kern #35 hole mud containing 7 pounds per API barrel of slaked lime was treated by the addition of a water solution of 1.75 pounds per barrel of calcium pyruvate. As a result of this treatment, the semiplastic, flocculated mass was converted to a thin desirable mud slurry having a Stormer viscosity at 600 R. P. M. and 77° F. of 21.8 centipoises.

As previously indicated, the addition required depends upon the characteristics of the starting mud and the viscosity reduction required to bring the mud to the required value of viscosity.

The present invention is applicable to the modification or reconditioning of an existing mud or equally well to the formulation of a fresh mud in which the several essential ingredients are initially combined. It may be practiced by simply effecting a thorough intermixing of the mud ingredients together with the viscosity reducing agent.

The present invention also contemplates the inclusion in the drilling fluid composition of the usual drilling mud constituents, additives and modifiers in addition to the clay and additives previously mentioned.

Typical mud additives are so-called weighting agents such as barytes, litharge, pyrites, etc.; the various modifiers such as boiled starch, soaps, gums and the like; and the wall building and water loss modifying materials conventionally employed to control physical properties and particularly the thixotropic properties of the mud.

The dispersible clay constituent may comprise a native clay and/or any of the more readily dispersible clays such as bentonite.

In use, as above intimated, the mud passes downwardly through the drill pipe, through the rotary bit and then upwardly through the bore hole carrying with it the cuttings which are appropriately filtered and settled out at the surface before the mud is returned.

The pyruvic acid products are particularly advantageous from the standpoint of insensitivity to calcium ions encountered in subsurface drilling, and the fluid treated therewith is not materially affected by such contaminants.

In general, reference herein to high alkalinity or to high alkalinity limed muds contemplates alkalinities in the range of above about 9–9.5 and up to about 13 or above.

Obviously, many modifications and variations of the invention as herein set forth may be made without departing from the spirit and scope thereof, therefore, only such limitations should be imposed as are indicated in the appended claims.

I claim:

1. A drilling fluid comprising an aqueous suspension of clay which is responsive to viscosity control by means of quebracho extract, said fluid containing a viscosity reducing agent of the class consisting of pyruvic acid and its water soluble alkali metal and alkaline earth metal salts, in an amount sufficient to regulate the viscosity of said drilling fluid.

2. A drilling fluid in accordance with claim 1 containing an amount of said viscosity reducing agent in the range of about 0.1–5.0 pounds per barrel of mud.

3. A drilling fluid in accordance with claim 1 wherein said fluid comprises lime in substantial amount.

4. A drilling fluid in accordance with claim 1 wherein said fluid comprises calcium in substantial amount.

5. A drilling fluid in accordance with claim 1 wherein said drilling fluid is a high pH, limed mud.

6. A drilling fluid in accordance with claim 1 wherein said drilling fluid has a pH in the alkaline range.

7. The method of treating an aqueous drilling fluid comprising an aqueous suspension of clay, which is responsive to viscosity control by means of quebracho extract, to reduce the viscosity thereof which comprises adding to said fluid a viscosity reducing agent of the class consisting of pyruvic acid and its water soluble alkali metal and alkaline earth metal salts.

8. The method according to claim 7 wherein said viscosity reducing agent is added in an amount in the range of about 0.1–5.0 pounds per barrel of drilling fluid.

9. The method according to claim 7 wherein said drilling fluid comprises a high pH, limed mud.

10. The method according to claim 7 wherein said drilling fluid comprises calcium in substantial amount.

11. In the drilling of a well by the rotary method wherein a drilling fluid comprising an aqueous suspension of clay, which is responsive to viscosity control by means of quebracho extract, is circulated through the bore hole of the well during the drilling operation, the step of treating the drilling fluid to control its viscosity which comprises mixing therewith a substantial amount of viscosity reducing material of the class consisting of pyruvic acid and its water soluble alkali metal and alkaline earth metal salts.

12. The method according to claim 11 wherein said viscosity reducing agent is added in an amount in the range of about 0.1–5.0 pounds per barrel of drilling fluid.

13. The method according to claim 11 wherein the drilling fluid comprises substantial proportions of caustic soda and lime.

References Cited in the file of this patent

UNITED STATES PATENTS 2,477,157    Wayne _____ July 26, 1949

OTHER REFERENCES

Whitmore: Organic Chemistry, 2nd edition, published 1951, by D. Van Nostrand Co. of New York, pp. 365 and 401.

Chattaway et al.: The Decomposition of Tartaric acid by Heat, article in the Chemical Society Journal, New Series, vol. 119, 1921, pages 34 to 37.

Hurd: Pyrolysis of Carbon Compounds, pub. 1929 by The Chemical Catalog Co. of New York, pages 242 and 436 to 442.